Jan. 17, 1967 L. E. SODERQUIST 3,298,066

TIRE PRESSES

Filed May 2, 1962 4 Sheets-Sheet 1

INVENTOR.
LESLIE E. SODERQUIST

BY Hamilton & Cook

ATTORNEYS

TIRE PRESSES

Filed May 2, 1962 4 Sheets-Sheet 3

INVENTOR.
LESLIE E. SODERQUIST
BY Hamilton & Cook
ATTORNEYS

Jan. 17, 1967 L. E. SODERQUIST 3,298,066

TIRE PRESSES

Filed May 2, 1962 4 Sheets-Sheet 4

INVENTOR.
LESLIE E. SODERQUIST
BY Hamilton & Cook
ATTORNEYS

United States Patent Office 3,298,066

Patented Jan. 17, 1967

3,298,066

TIRE PRESSES

Leslie E. Soderquist, Silver Lake, Ohio, assignor to McNeil Corporation, Akron, Ohio, a corporation of Ohio Filed May 2, 1962, Ser. No. 191,821
5 Claims. (Cl. 18—17)

The present invention relates to improvements in tire presses having a permanent diaphragm mechanism for shaping and curing tire bands within relatively movable or separable mold sections or halves. More particularly, the invention relates to improvements for positioning a partially shaped tire band in a press having a permanent diaphragm shaping or center mechanism located axially of a press mold half and for progressively distending or inflating the diaphragm into the tire band for full shaping thereof and curing.

As shown, the invention relates to: the precise loading of a partially shaped uncured tire band in telescoped relation over an extended diaphragm positioned axially of a lower mold section, with the lower bead of the tire band adjacent the lower end of the diaphragm, with the lower body portion of the diaphragm spanning the open space between the upper and lower beads, and with the upper body portion of the diaphragm projecting upward and beyond the tire band for a substantial distance; the positive restraining of the projecting upper portion of the diaphragm, while applying fluid pressure within the diaphragm, for finally shaping the tire band by a cylindrical member carried axially of an upper mold section; and, the positive exerting of a downward pressure on the top of the diaphragm, by a plate movable coaxially of the cylindrical member, during application of the fluid pressure and during curing.

Various developments in the art of tire buliding have required that permanent diaphragm or bag presses be adapted to receive and shape uncured tire bands which have been at least partially shaped in toroidal form, or preformed, during the building operation. As illustrated by the inventor's United States Patent No. 2,997,738, early activities in this field were directed to the final shaping and curing of large heavy duty truck tires built with several plies of rubber coated woven or braided, wire or metallic reinforcements. The preformed truck tire bands have substantial inherent dimensional stability and will not readily collapse or deform by their own weight if stored for a length of time between building and curing. Also, truck size tires have relatively large bead diameters, and substantial height even in the uncured condition, permitting the use of permanent bag center or shaping mechanisms as illustrated by the inventor's United States Patents No. 2,495,663 and No. 2,669,572. These center mechanisms use a bag open at both ends and closed by upper and lower mating plate ring-bead ring assemblies. Because of the large tire factors of height and bead diameter, these center mechanisms could have interior heighth dimensions permitting use of stacking sleeves for controlling downward movement of the upper plate ring-bead ring assembly, and sufficient interior width dimensions for ample gland or packing material to prevent loss of pressure fluid during the shaping and curing operations.

Recent developments in the art of tire building, particularly in the design of tires with specific and critical orientation of the ply components intended to minimize squeezing or distortion of the tread under stress conditions and to provide optimum adhesion on curves and wet surfaces, have led to use of preforming techniques for passenger car size tires. Preformed passenger car tire bands with rayon, nylon, or cotton fabric plies have little inherent dimensional stability and are very likely to collapse or deform by their own weight if stored for any length of time after building. Further though preformed passenger tire bands can be cured in the manner described above for truck tires, the factors of low height and small bead diameter do present problems.

Therefore, it is the purpose of the present invention to generally improve the operation of a press being used for the final shaping and curing of at least partially shaped or preformed tire bands. Specifically, it is an object of the invention to improve the final shaping and curing of small preformed tire bands, particularly of passenger car size.

Stll further, it is an object of the invention to provide presses for shaping and curing preformed tires which are automatic and capable of operation without direct operator control or supervision and which may be loaded with a preformed tire band and closed with the diaphragm positioned within the tire ready for final shaping and curing without damage to either the uncured band or the center mechanism.

These and other objects of the invention, as well as the advantages thereof, will be apparent in view of the following detailed description and the attached drawings.

*General description*

Figure 1:
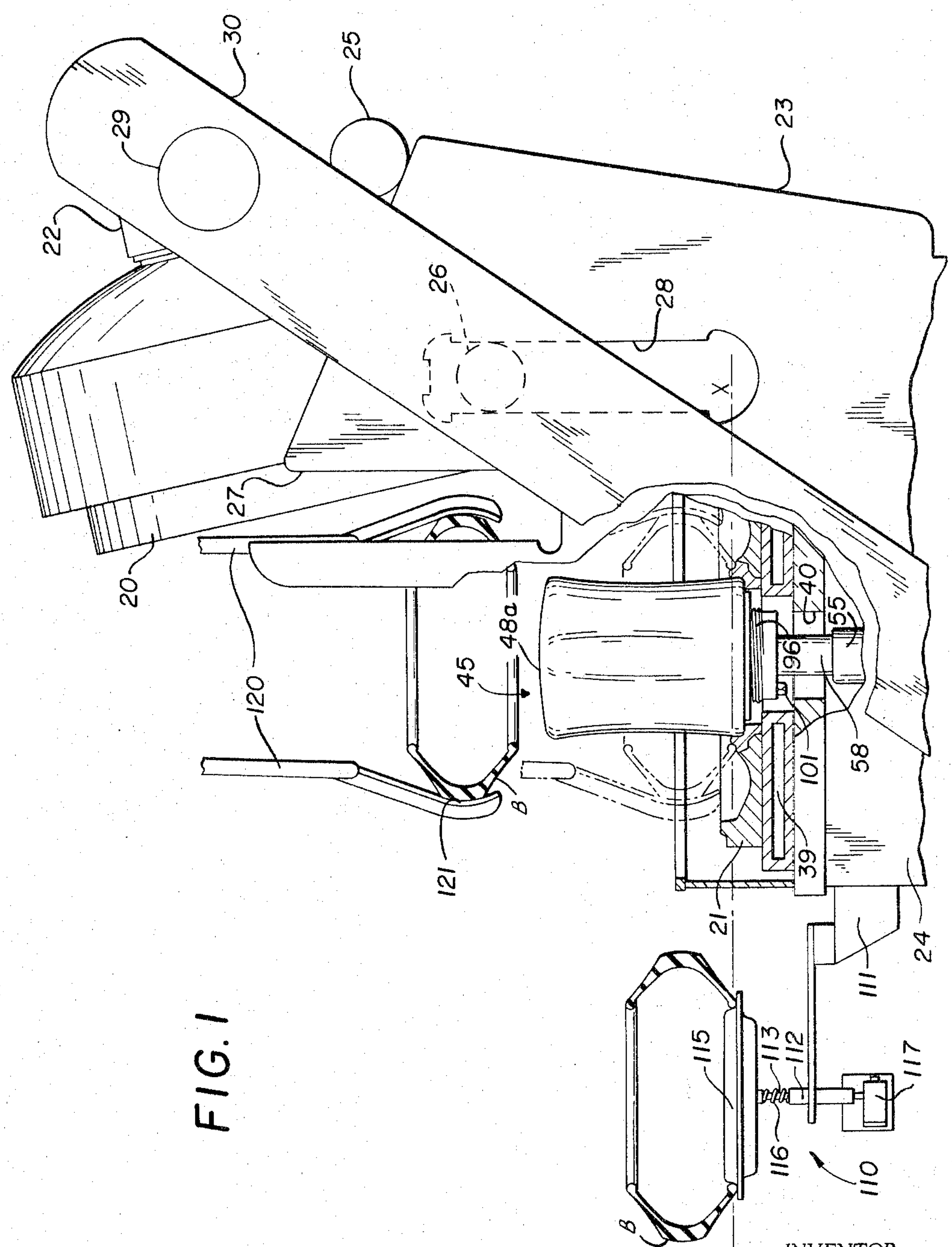
FIG. 1 is a fragmentary side elevation, partly in section, showing the press when open for loading of a tire band over an extended diaphragm.

A tire curing press suitable for practice of the invention has relatively movable or separable upper and lower mold halves or sections, 20 and 21. The upper or movable sections 20 are carried on the underside of a heavy crossbeam 22 which extends across the press and constitutes one of the links of the operating mechanism by which the press is opened or closed. Referring to FIG. 1, on opposite sides of the lower mold sections 21 are guide plates 23 extending upwardly from a base or bed plate 24. Near each end of the crossbeam are suitable arms (not shown) having roller means 25 and 26 engageable in parallel front and rear guideways, 27 and 28, for guiding the crossbeam during opening and closing movements. Each end of the crossbeam has a trunnion 29 rotatably mounted in the upper end of an operating link 30 located outside of a guide plate 23. The links 30 are actuated by large motor-driven bull gears (not shown) to raise and lower the crosshead 22.

Figure 2:
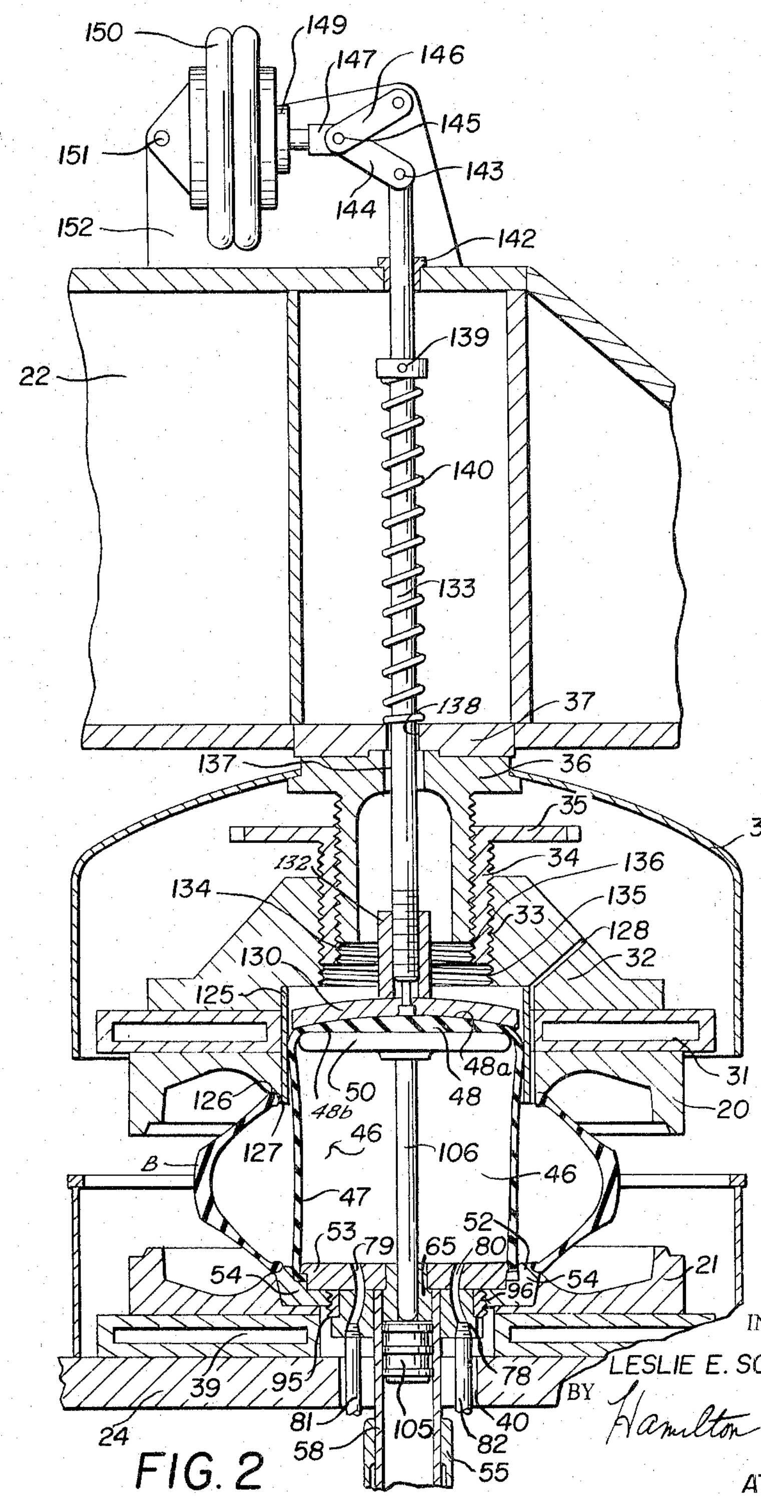
FIG. 2 is a sectional view, taken through the press top link, mold sections and center mechanism, showing the press partly closed and the diaphragm prior to expansion between the tire beads into the preformed tire band.

Refering to FIG. 2, an upper mold section 20 is carried from the underside of a heating platen 31 fastened to a wide block or support 32. The upper central or hub area of the support 32 has axially extending threads 33 for mating engagement with the external threads of a double-threaded connector 34 which is adjustable by the gear wheel 35 to adapt the press for various size mold sections. The internal threads of connector 34 are in mating engagement with external threads of a bell-shaped support 36 fastened to a boss 37 on the underside of the crossbeam 22. The upper mold is shielded by a dome 38 attached to the central support 36.

A lower mold section 21 is carried on the upper side of a heating platen 39 fastened to the base or bed plate 24. Beneath each mold section 21 the base 24 has a central well or axial bore 40 through which extends the operating mechanism for the diaphragm center mechanism.

Press elements 20 to 40 described above are shown in a number of prior art patents to the inventor, including U.S. Patent No. 2,808,618 to which references is made for such details of presses as are required to more fully understand the invention. These presses are constructed so that it is possible to obtain a maximum "tilt-back" of the upper mold section and clearance above the lower mold section without loss of valuable headroom above the press. In this type of press, the operating mechanism moves the upper mold section and clearance above the lower mold mold section 21 during the last part of the closing movement. This type of press is preferred, but it will be apparent that presses of other types and designs having relatively movable mold halves and permanent diaphragm center or shaping mechanisms could be used in the practice of the invention; for example, presses in which the upper mold section is not moved entirely out of the way and to one side of the press, or presses in which the movable mold section is moved in a straight line throughout its entire cycle, or presses in which the center mechanism is carried on the upper or the movable mold section, so long as the preformed uncured tire band B may be appropriately positioned in registry with the center mechanism and relative to a mold section.

The permanent diaphragm shaping or center mechanism located axially of the mold sections 21 and indicated generally at 45 is of a recently developed type and is particularly well suited for the final shaping and curing of preformed passenger car size tires.

Figure 3:
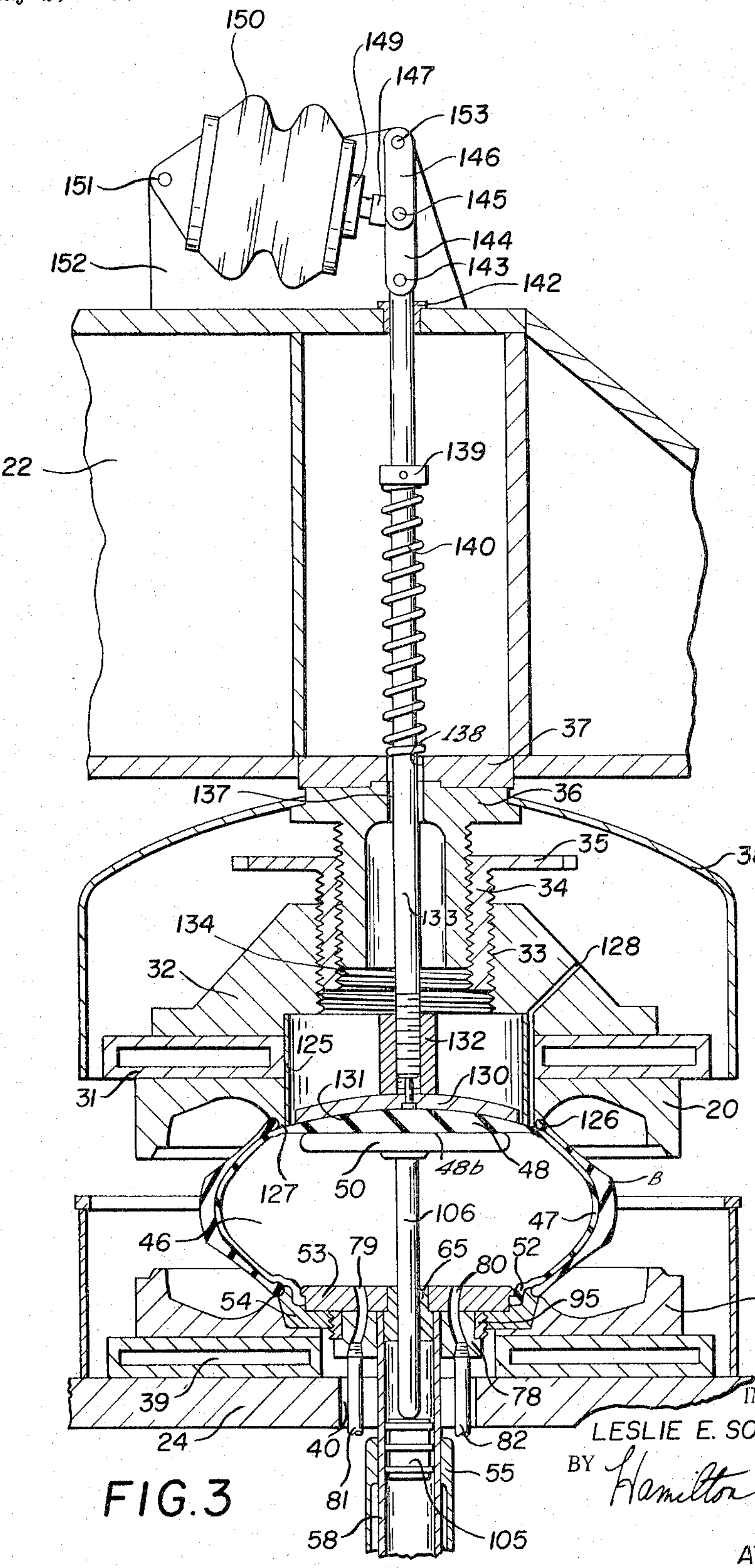
FIG. 3 is a sectional view, following in sequence after FIG. 2, showing the diaphragm after expansion or radial distention into the tire band.
Figure 4:
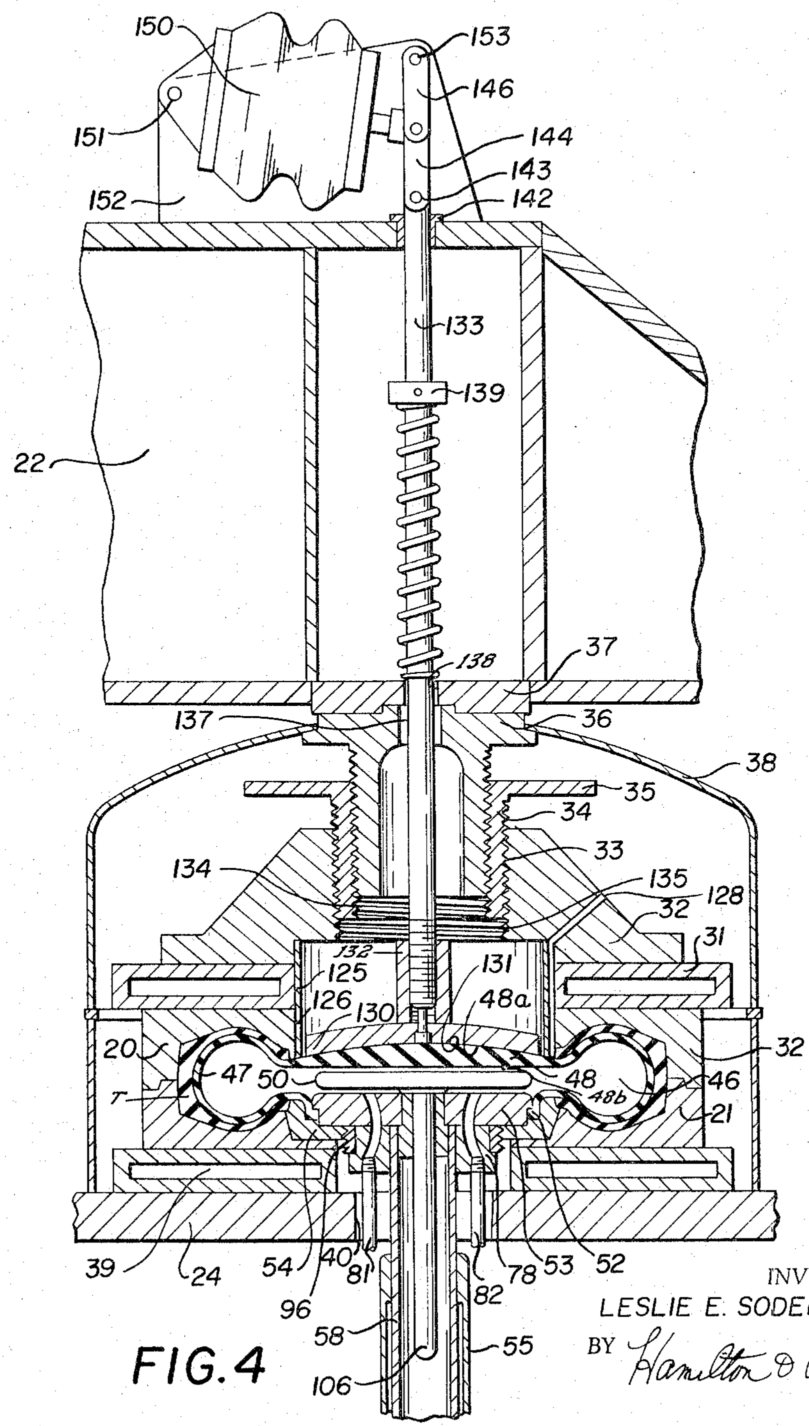
FIG. 4 is another sectional view showing the press mold sections in closed position for the curing operation.

Referring to FIGS. 2–4, the diaphragm bag or bladder 46 of the center mechanism 45 is a deformable and radially distensible structure open at the lower end and initially elongate, having the shape or form of a cylindric cap. The side wall 47 of the bag is of substantially uniform thickness. The upper or closed end 48 of the bag is substantially thicker than the side wall 47, being what is best described as plano-convex in cross-section. The convex upper surface 48*a* is concentrically contacted and pushed down during the final shaping and curing of a preformed tire band B, as described in detail below. The planar lower surface 48*b* is selectively contacted by a substantially flat plate 50 of the bag actuating means.

The lower or open end of the bag 46 has an annular configuration best described as an L-shaped, radially inwardly directed flange 52 intended to be confined and sealed between cooperating surfaces on a circular member or plate ring 53 and a bead ring 54.

A stationary member 55 of the center mechanism extends coaxially of the press base well bore 40. The upper end of the stationary member or cylinder guide 55 has a flange (not shown) securely attached to the press bed plate 24 adjacent the platen 39. Extending slidably through a machined bore in the member 55 is a cylinder tube 58.

The lower end of the cylinder tube 58 is not shown, but is closed by a cap having an orifice communicating with a source of pressure fluid. Further, the under side of the closure cap has a stirrup for receiving the movable element of an actuating mechanism for elevating the bead ring 54 to strip the cured tires T from the lower mold section. For such details as may be required to more fully understand these elements of the center mechanism, reference may be made to a number of prior art patents to the inventor, including U.S. Patents No. 2,495,663, No. 2,699,572, No. 2,715,245 and No. 2,836, 847.

Fitted into the upper end of the cylinder tube 58 is a hub member 65 having a machined axial bore slidably receiving the piston rod actuating the bag plate 50. Extending radially of the cylinder tube 58 and the hub member 65 is a pressure fluid manifold 78 having pressure fluid chambers 79 and 80 opening into the interior of a bag 46 adjacent the hub member 65. The lower end of the chambers 79 and 80 communicate with service lines 81 and 82. For purpose of disclosure, line 81 is considered as being the conduit for connection to drain and line 82 is considered as being the conduit for connection to sources for vacuum, shaping media and curing media.

For clamping of the bag flange 52, the bead ring 54 is adjusted with relation to the plate ring 53 by a ring or annular gear member 95 supported by and selectively rotatable around the manifold 78. The outer surface of the ring member 95 is machined to provide a peripheral thread 96 for continuous mating engagement with corresponding internal threads around the axial bore of the bead ring 54. Manual rotation of the gear member 95 as by a driver 101 (see FIG. 1) will move the plate ring 54, depending upon the direction of rotation, toward and away from the plate ring 53.

The bag actuating plate 50 is raised for bag elongation or extension by a free floating piston 105 selectively contacting the lower end of piston rod 106 slidably received in the hub member 65. Pressure fluid introduced into the cylinder tube 58 will raise the piston rod 106 and extend the upper or closed end 48 of the bag to the maximum elevation. Raising of the piston rod will continue until the piston rod 106 seats against the underside of the hub member 65. Thus, the length of the piston rod 106 will determine the extended height of the diaphragm bag 46.

Referring to FIG. 1, for automatic operation of a press according to the invention, a loading platform indicated generally at 110 may be provided for supporting an uncured tire band B on a vertical axis in front of the lower mold sections 21. Each platform has a cantilever support bracket 111 extending outwardly in front of the press base. The outer end of the bracket 111 carries a hollow sleeve 112 vertically adjustable in relation to the bracket. Extending through the bore of sleeve 112 is a slidable shaft 113. The upper end of the shaft 113 carries a loading pan or band support 115. Fitted around shaft 113 between the sleeve 112 and the pan 115 is a coiled spring 116 to maintain the pan in a slightly elevated position when there is no uncured tire band thereon. When a band B has been placed on the pan, the resistance of spring 116 will be overcome and the lower end of shaft 113 can actuate an electrical switch 117 for signalling to a press controller unit (not shown) that a band B is in position to be engaged and picked up by a series of circularly arranged loading segments 120.

For the loading of preformed passenger car size tires, it is preferred that the lower or paddle portion 121 of each loading segment 120 have a relatively wide and concave inner face to provide maximum contact and holding force against the tread or medial portion of an uncured tire band B. It is further preferred that the actuating linkage (not shown) for moving the segments 120 and holding paddles 121 radially inward toward the axis of a band B be adjusted so that the tread portion of the band will be slightly compressed upon contact with the paddles. It has been found that in the event of collapse or deformation of a band B after building, which could result in the tire beads moving toward each other, uniform application of a moderate inward force against the tread portion during pickup, loading or positioning will generally move the bead areas apart, increasing the span of the open space between the beads.

The loading segments 120 are raised and lowered and rotated into and out of the press for pickup of a tire band from the pan 115 and for positioning thereof in telescoped relation over the extended diaphragm of the center mechanism 45 by an operating mechanism which is not shown. Generally, such operating mechanism could include a rigid boom arm mounted on and extending laterally from a press member such as the guide plates 23, means to rotate the boom arm between a position of registry with a tire loading pan 115 and a position of registry with a center mechanism 45, and shaft, piston and cylinder elements carried by the boom arm for actuating the linkage for moving the loading segments 120. Alternatively, the loading segments 120 could be a transfer device or band holder and operating mechanism as contemplated in the inventor's prior U.S. Patent No. 2,927,343.

Referring still to FIG. 1, it will be noted that an imaginary horizontal line denoted $x—x$ is drawn across between the seat of the bead ring 54 and the seat of the loading pan 115. As described above, the platform sleeve 112 is vertically adjustable. It is preferred that the plane or height of the pan 115 relative to the seat of the bead ring 54 be substantially the same, that is, be established and maintained as indicated by the line $x—x$, to facilitate operation of the loading segments 120 in providing for accurate and precise positioning of a tire band B in telescoped relation over the extended bag 46 of the center mechanism. When the band B has been located in this registry, the holding segments are radially expanded and withdrawn and closing of the press for final shaping and curing can commence.

Referring to FIGS. 2–4, located axially of an upper mold section 20 are means for housing, confining or restraining the projected body portion of a diaphragm 46 when a preformed uncured tire band has been positioned in telescoped relation over an extended diaphragm. As shown, the central or hub areas of the upper mold section 20 and the platen 31 and the underside of the support 32 have aligned large diameter bores for receiving an annular can or restraining cylinder 125. The diameter of the cylinder 125 is established by dimensional factors of the bag 46, which, in turn, are established by the particular tire band being fully shaped and cured in the press.

During curing (see FIG. 4), the upper bead of the band B is contacted by an annular bead ring area in the upper mold indicated at 126. The external diameter of the cylinder 125 is preferably slightly less than the smallest diameter of the bead ring 126. The internal diameter of the cylinder 125 is preferably slightly greater than the diameter of the closed upper end 48 of the diaphragm when elongated by raising of the actuating plate 50. The lower edge 127 of the cylinder is smoothly curved to provide a minimum of frictional resistance and to serve as a guide as the diaphragm 46 is radially expanded to full shaping position within the band B. If desired, the bead ring 126 could be fabricated integrally with the cylinder 125.

As the final shaping operation commences, any air entrapped between the tire band and the expanding bag 46 may be vented to the atmosphere through a series of vertical bores or apertures 128 extending upwardly along the outer surface of the cylinder 125, through the mold section 20 and platen 31, and out through the support 32 beneath the dome 38.

During the final shaping and curing operation, the projecting upper body portion of the diaphragm 46 is forced downward under the pressure or force exerted by a means movable coaxially of the restraining cylinder 125. As shown, the movable means is a plate 130 having a diameter slightly less than the internal diameter of the cylinder 125 and a concave lower face 131 for uniform contact and pushing force against the convex upper surface 48*a* of the diaphragm of the center mechanism.

On the upper surface of the plate 130 is a hollow sleeve 132 for vertically adjustable attachment of the push plate to the lower end of a long push rod 133. The push rod is slidably journaled in the axial bore of a plug member 134 closing the large axial bore of the support 32 above the cylinder 125. The lower portion of the plug member has external threads for mating engagement as at 135 with the axially extending threads of the support 32. The upper portion of the plug member has a reduced diameter with external threads for mating engagement as at 136 with the internal threads of the connector 34.

Above the plug member 134, the push rod 133 extends upwardly through a coaxial bore 137 in the bell-shaped support 36 and an aligned bore 138 in the boss 37 into the crossbeam 22. Within the crossbeam 22, which is suitably fabricated to provide adequate housing or enclosure, the push rod 133 carries an adjustable collar 139. Fitted around the push rod is a strong coiled spring 140 seated between the collar 139 and the upper side of the boss 37. The spring 140 assists vertical recovery of the push rod and plate 130 to the static or inactive position within the cylinder 125 after the curing operation.

The upper end of the push rod 133 extends through a bushing 142 in the upper surface of the crossbeam 22 and is pivotally connected as at 143 to a lower toggle link 144. The lower link 144 is connected as at 145 to an upper toggle link 146. At connection 145, the toggle linkage carries a yoke 147 attached to a shaft carried by the movable end plate 149 of an actuation means 150. As shown, the actuation means is a double convolution air spring type bellows. The use of an air spring is preferred to eliminate seepage of pressure fluid onto the upper surface of the crossbeam 22. Also, an air spring in the collapsed condition (see FIG. 2) has considerably more power than it does in the extended position which is exactly the reverse of a collapsed toggle linkage. Therefore, by combining an air spring with the toggle links 144 and 146, a substantially uniform force will be exerted throughout the downward stroke of the push rod 133.

The fixed end of the air spring 150 is attached as at 151 to a bracket 152 secured to the crossbeam. The bracket 152 also carries as at 153 the upper end of the toggle link 146.

*Summary*

When the press is open, the condition of FIG. 1, a partially shaped uncured tire band supported by the platform 110 is loaded into the press by the segments 120. The preformed band is positioned in telescoped relation over the diaphragm of the center mechanism 45 which has been extended by the pressure fluid introduced into the cylinder tube 58 beneath the piston 105. The lower bead of the tire band is adjacent the lower end of the diaphragm 46 and is seated on the bead ring 54 and the lower mold sections. The lower body portion of the diaphragm is spanning the open space between the upper and lower beads. The upper body portion of the diaphragm projects upward and beyond the upper tire bead a substantial distance.

After withdrawal of the loading segments 120, the press closes by movement of the upper mold section 20 toward the lower mold section 21. The press closing movement is preferably or momentarily delayed when the upper bead ring 126 touches the tire band B, the condition of FIG. 2, then, pressure fluid for radially expanding the diaphragm 46 is introduced into the center mechanism through chamber 80 and service line 82.

As the diaphragm 46 begins to radially expand between the upper and lower tire beads, the cylinder 125 positively restrains the portion of the diaphragm above the upper bead and the lower cylinder edge 127 guides the diaphragm wall 47 into the shaping band B. During expansion of the diaphragm, air entrapped therein vents through openings 128.

The condition of FIG. 3 is achieved momentarily after commencement of the final shaping operations. The air spring 150 has been actuated to extend the toggle linkage moving the push rod 133 downward. The push plate 130 contacts the upper surface 48*a* of the bag 46 which is pushed down against the resistance afforded by the internal shaping pressure introduced through chamber 80, the pressure against the underside of piston 58 having been relieved, until the plate 130 is substantially aligned with the cylinder edge 127 and the bead ring 126.

The condition of FIG. 4 is for curing of the tire band B with the press fully closed. During curing, the toggle linkage actuating the push rod 133 is closed and remains so until the press opens at the end of the curing cycle.

The above description and the accompanying drawings are considered sufficient to enable one skilled in this art to understand the principles and working of the press according to the invention. However, it will be appreciated that exact details are not essential and the concept of the invention may be varied or modified within the scope of the advance in the art and the appended claims. Further, while the invention has been shown and described with references to one pair of mold sections 20 and 21, the principles thereof have equal application in dual presses. Also, no showing has been made of any wiring diagram and switches by which loading and closing of the press, admission of the shaping and curing media, energizing of the actuation means 150, etc. are automatically controlled, since such details may be designed by any qualified electrical engineer when the sequence of operations as described herein are understood.

What is claimed is:

1. A press for full shaping and subsequent curing of a preformed tire band within separable upper and lower mold sections (20 and 21) having a permanent diaphragm shaping mechanism located axially of a lower mold section (21), comprising, means (110) for supporting a tire band on a vertical axis in front of and on substantially the same horizontal plane as said lower mold section, means (120) for picking up a tire band from said support means and positioning said band on said lower mold section in telescoped relation over said diaphragm, the upper body portion of said diaphragm projecting above said positioned band, cylindrical means (125) carried axially of an upper mold section (20) restraining said projecting diaphragm body portion, and plate means (130) movable coaxially of said cylindrical means for exerting a downward pressure on the projecting diaphragm during the full shaping and subsequent curing of said tire band when the press is closed.

2. Apparatus according to claim 1 wherein a series of apertures (128) extend upwardly along the outer surface of the cylindrical means and vent to the atmosphere.

3. Apparatus according to claim 1 in which said cylindrical means has an external diameter slightly less than the smallest diameter of said lower mold section and a lower edge which is smoothly curved.

4. In a press for final shaping and curing of partially shaped tire bands, said press having at least two relatively movable mold sections, one of said mold sections being fixed and the other of said mold sections being carried by a movable crossbeam, and a permanent diaphragm center mechanism located axially of said fixed mold section, the improvement comprising; restraining means carried axially of said movable mold section for restraining the upper body portion of said diaphragm which projects above a partially preformed tire band on said fixed mold section in registry with said diaphragm, a push rod extending upwardly through said restraining means and said crossbeam, toggle linkage connected to the upper end of said push rod above said crossbeam, actuation means connected between said toggle linkage and said crossbeam, and plate means carried on the lower end of said push rod and movable coaxially of said restraining means away from said crossbeam for exerting a downward pressure on the upper body portion of said diaphragm during full shaping and curing of said tire band.

5. Apparatus according to claim 4 in which the said actuation means is a double convolution air spring bellows.

References Cited by the Examiner

UNITED STATES PATENTS

| | | | |
|---|---|---|---|
| 2,559,119 | 7/1951 | Frank | 18—53 XR |
| 2,747,225 | 5/1956 | Zona. | |
| 2,778,060 | 1/1957 | Brundage | 18—2 X |
| 2,874,405 | 2/1959 | Stanford | 18—53 X |
| 2,997,738 | 8/1961 | Soderquist | 18—53 X |
| 3,012,279 | 12/1961 | Boysen. | |
| 3,053,400 | 9/1962 | Erickson et al. | 18—17 XR |
| 3,065,503 | 11/1962 | Mallory et al. | |
| 3,071,811 | 1/1963 | Herbert. | |

ALEXANDER H. BRODMERKEL, *Primary Examiner.*

MORRIS LIEBMAN, ROBERT F. WHITE, *Examiners.*

A. L. LEAVITT, D. J. ARNOLD, *Assistant Examiners.*